No. 731,574. PATENTED JUNE 23, 1903.
E. A. JOHNSTON.
REAPING ATTACHMENT FOR MOWERS.
APPLICATION FILED APR. 10, 1902.
NO MODEL. 4 SHEETS—SHEET 1.

Witnesses:
E. M. Olmsted
Chas. J. O'Neill

Inventor:
E. A. Johnston
By Penne & Goldsborough
Attorneys

No. 731,574. PATENTED JUNE 23, 1903.
E. A. JOHNSTON.
REAPING ATTACHMENT FOR MOWERS.
APPLICATION FILED APR. 10, 1902.
NO MODEL. 4 SHEETS—SHEET 3.

Witnesses:
E. M. Olmsted
Chas. J. O'Neill

Inventor:
E. A. Johnston
Pennie & Goldsborough
Attys.

No. 731,574. PATENTED JUNE 23, 1903.
E. A. JOHNSTON.
REAPING ATTACHMENT FOR MOWERS.
APPLICATION FILED APR. 10, 1902.
NO MODEL. 4 SHEETS—SHEET 4.
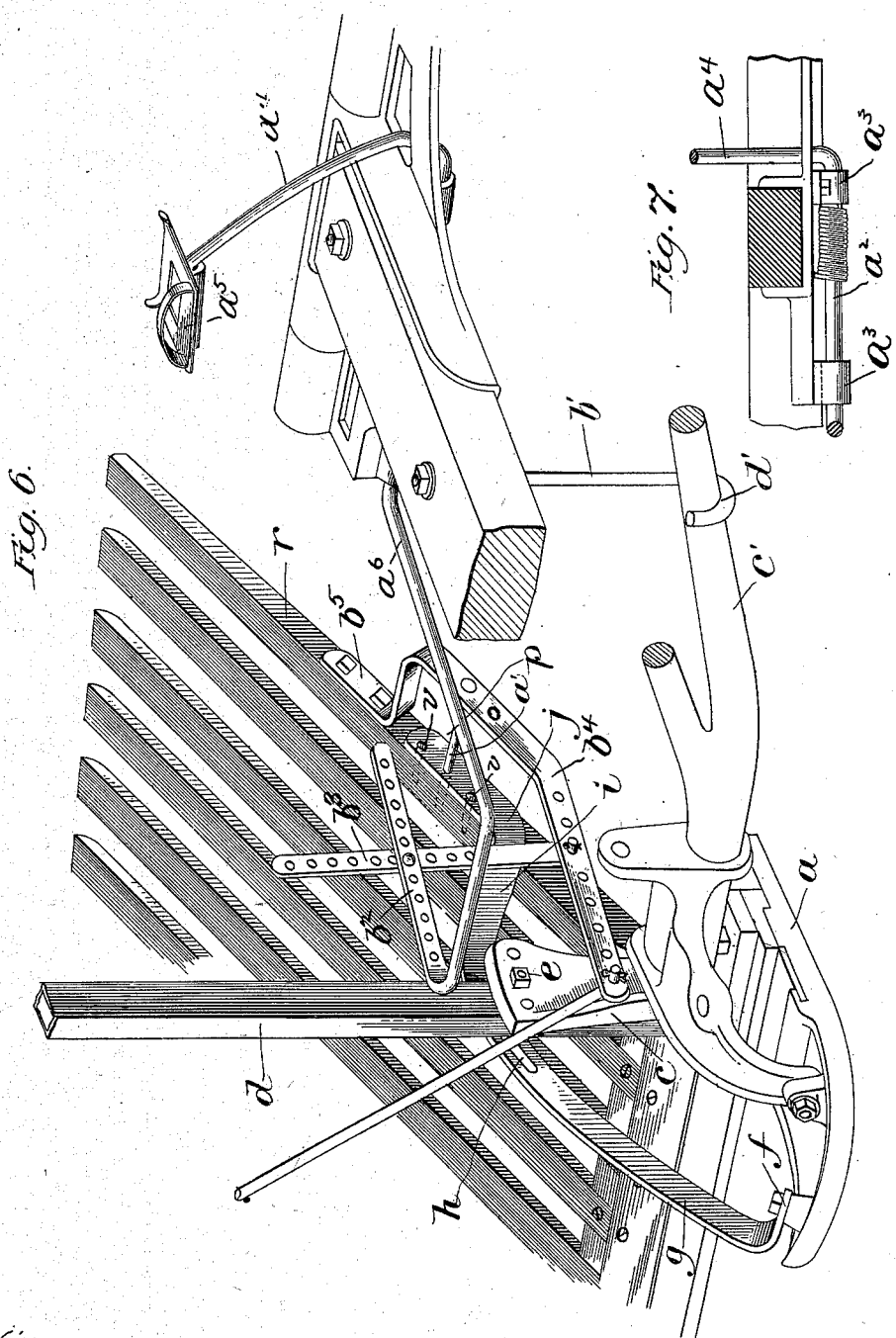

No. 731,574. Patented June 23, 1903.

UNITED STATES PATENT OFFICE.

EDWARD A. JOHNSTON, OF CHICAGO, ILLINOIS, ASSIGNOR TO McCORMICK HARVESTING MACHINE COMPANY, OF CHICAGO, ILLINOIS.

REAPING ATTACHMENT FOR MOWERS.

SPECIFICATION forming part of Letters Patent No. 731,574, dated June 23, 1903.

Application filed April 10, 1902. Serial No. 102,268. (No model.)

*To all whom it may concern:*

Be it known that I, EDWARD A. JOHNSTON, a citizen of the United States, residing at Chicago, county of Cook, State of Illinois, have invented certain new and useful Improvements in Reaping Attachments for Mowers; and I do hereby declare the following to be a full, clear, and exact description of the invention, such as will enable others skilled in the art to which it appertains to make and use the same.

The object of the invention is to provide a rear-delivery grain-receiving attachment adapted for temporary connection to the finger-bar of a mowing-machine, so as to convert the machine from a mower into a reaper, and thereby adapt it for the performance of the double duty of mowing grass or reaping grain.

The attachment consists generally of a rectangular slatted platform, which is pivotally connected in rear of the finger-bar on a line parallel therewith and is under the control of the driver, so that he may drop its rear end so as to leave the grain deposited on the ground in gavels lying lengthwise the line of draft of the machine. No raking devices are employed with this type of dropper. As the grain is cut it is laid back on the slats of the platform by the revolving arm of the reel, and when the platform is tilted to discharge the gavel its front end rises, so as to form a cut-off or stop for the grain to temporarily hold it until the platform is restored to its receiving position.

The details of the invention will be fully understood from the following description, taken in connection with the accompanying drawings, wherein—

Figure 1:
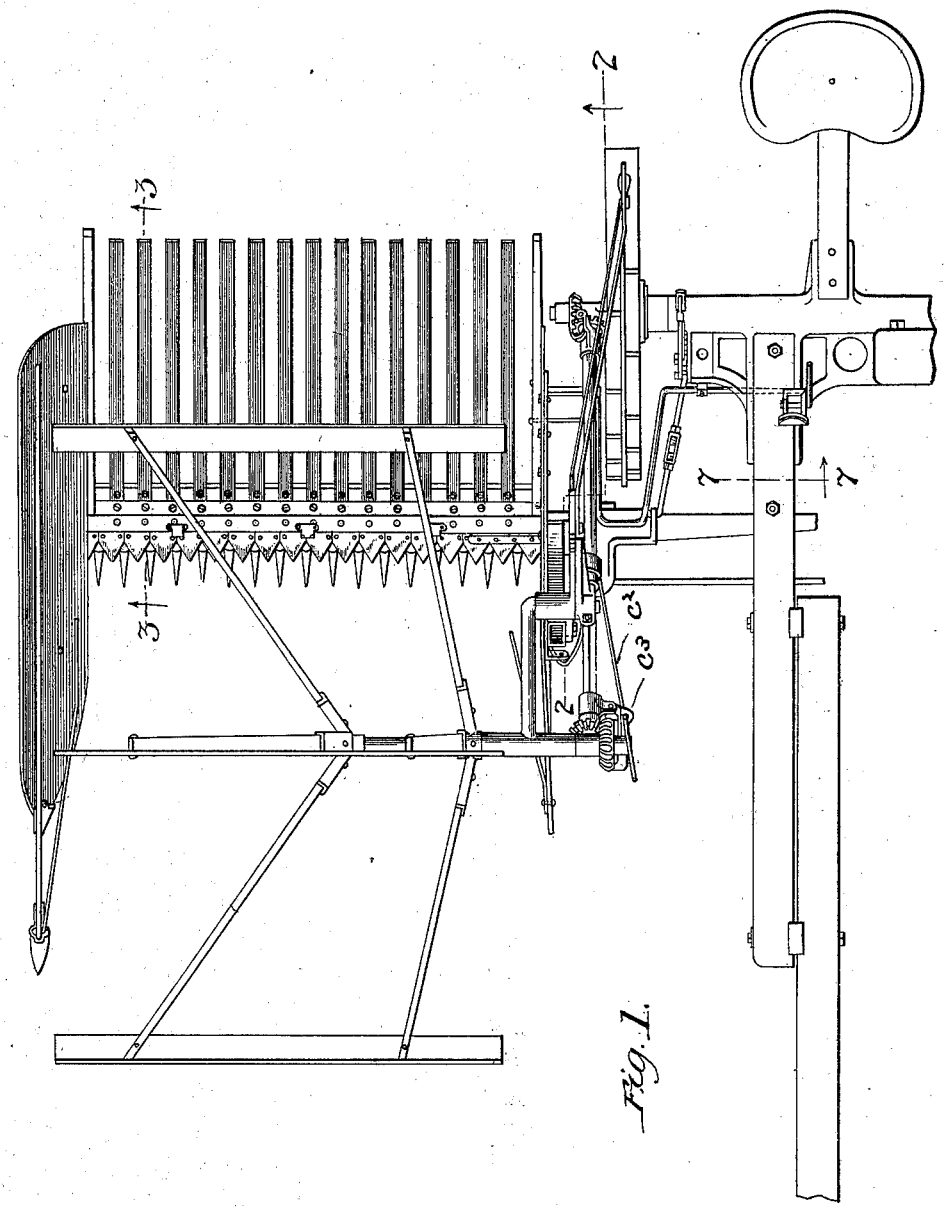
Figure 2:
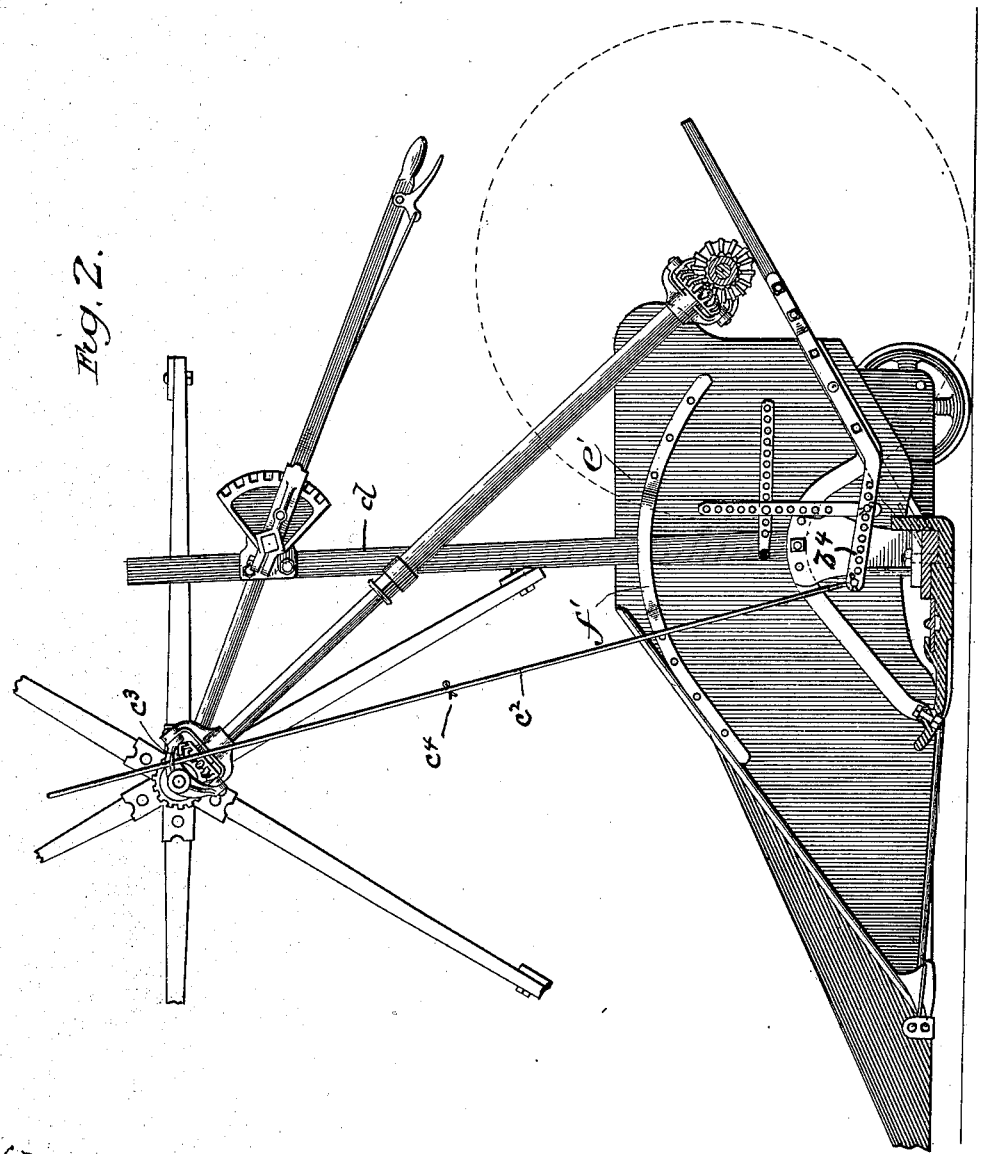
Figure 3:
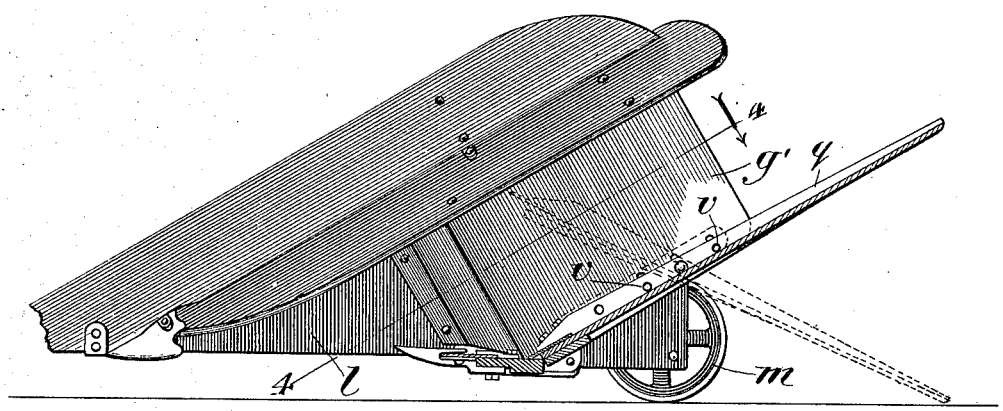
Figure 4:
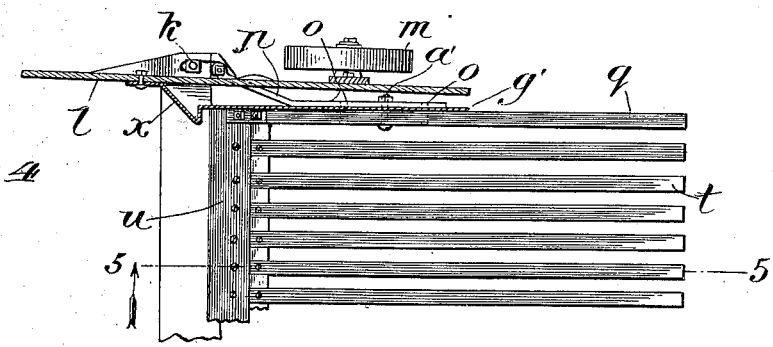
Figure 5:
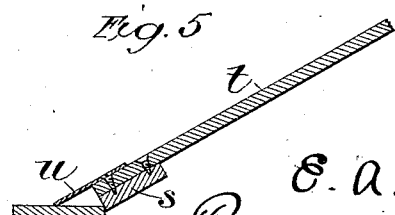

Figure 1 is a plan view of the entire machine. Fig. 2 is a section of Fig. 1 on the line 2 2. Fig. 3 is a section of the same figure on the line 3 3. Fig. 4 is a section of Fig. 3 on the line 4 4. Fig. 5 is a section of Fig. 4 on the line 5 5. Fig. 6 is a perspective of the parts adjacent to the inner end of the finger-bar, showing the arrangement for operating the platform; and Fig. 7 is a section of Fig. 1 on the line 7 7.

The attachment is adapted for connection to any of the standard types of mowers, and the construction of the machine will not therefore be described, except as it may be necessary to explain the manner of connecting or using the attachment.

As best shown in Fig. 6, the inner shoe $a$ has a bracket $c$ secured to it and standing vertically. To the outer side of this bracket the reel-post $d$ is secured by an adjustable bolt $e$. This bolt may be set into any one of a number of holes in the upper part of the bracket, so as to fix the reel-post at any desired inclination. A stout metal strap $g$ is secured at its forward end to the nose or point of the shoe at $f$ and curves upwardly and is clamped to the bracket $c$ by the same bolt which secures the reel-post. The strap is slotted at $h$ to permit the bolt $e$ to be adjusted, as above described, and in rear of the post it is bent abruptly stubbleward, as shown at $i$, to a point somewhat nearer the frame of the machine, when it is again bent at a right angle, as at $j$, and extends rearwardly at a slight upward inclination.

Of course the parts so far described are attached to the mower only when the machine is employed as a reaper, and at such time there is also attached to the outer shoe $k$ a divider-board $l$ and supporting-wheel $m$. There is also attached to the outer shoe an arm $n$, that projects inward through the divider-board and then extends rearward at an upward inclination corresponding with that of the rearward extension $j$ of the strap $g$ at the opposite end of the finger-bar. These two arms $n$ and $j$ constitute the supports for the platform, now to be described, and they are provided with holes or perforations $o$ and $p$, respectively, in line with each other to receive the bolts or pins forming the pivots on which the platform tilts.

The construction of the platform is fully illustrated in Figs. 4 and 5. No particular novelty is claimed for this construction; but, as here shown, it consists of two side bars $q$ and $r$, that are connected together at their front ends by a cross-piece $s$, and at short intervals along this cross-piece, filling the space between the side bars, are a series of slats $t$, which are unconnected at their free ends for a purpose well understood in these machines. The front ends of the slats are covered by a metal strip $u$, that is fastened to the cross-piece s, so as to project in front of its edge, as shown in Fig. 5. The side bars q and r of the platform are provided with holes v, corresponding in position and spacing to the holes in the two arms that are secured, as already described, to the inner and outer shoes. The platform is of a length just sufficient to fill the space between these arms, and it is hung to the arms by means of removable pins or bolts a', constituting pivots on which the platform may tilt, as indicated in dotted lines in Fig. 3.

As before described, the outer end of the finger-bar when the reaping attachment is employed is supported on the grain-wheel m. The inner shoe at this time must also be correspondingly raised, so that the whole cutting apparatus will be carried above the ground, as is usual in reapers. In order, therefore, to temporarily support this end of the finger-bar, a hanger b' is fastened to the tongue and depends in such position that the coupling-bar c' may be lifted and supported by a hook d' at its lower end.

The pivot-holes in the side arms n and r and the corresponding holes in the other side bars of the platform are so positioned with respect to the finger-bar and cross-sill s that when the platform is connected to the machine the metal strip u overlies the rear edge of the finger-bar, as shown in Fig. 5, and limits the downward drop of the front end and prevents the entrance of grass, straws, &c., between the rear edge of the bar and the cross-piece.

An inner divider e' is preferably employed as part of the attachment. It may be fastened by a strap f' to the reel-post or secured in place in any other manner. In connection with the outer divider it is advisable to employ a guard to keep the grain from catching in between the outer side of the platform and the divider-board. This guard is here shown as consisting of a sheet-metal plate g', which is secured at its forward edge to the board l and is extended rearward along the same and is secured to the side arm n between it and the side bar q of the platform. At its front end this guard is inclined inwardly, as shown at x in Fig. 4, to a point where it overlaps the outer end of the cross-piece s of the platform and its outer side bar, and from its point it is bent abruptly outwardly again, so as to form a recess in which the outer side bar q works, thereby effectually preventing the entrance of grass or straws between the bar and the divider-board.

The platform being constructed and connected to the machine in the manner thus described, it is operated by the following instrumentalities: As shown in Figs. 6 and 7, there is a rock-shaft $a^2$, journaled in bearings $a^3 a^3$ on the under side of the main frame just in front of and parallel with the axle. This rock-shaft has a crank-arm $a^4$ at its outer end, which projects upward through the frame into a position convenient to the driver's seat and has a stirrup or foot-piece $a^5$. At the opposite end of the crank-shaft there is another crank-arm $a^6$, which projects horizontally forward to about the plane of the reel-post, where it is bent sharply toward the post, as shown in Fig. 6, and has a return-bend $b^2$ extending rearward parallel with the part $a^6$. This return-bend is in effect part of the arm $a^6$, and it is connected by means of a strap $b^3$ to an arm $b^4$, which is connected to the side bar r of the platform in rear of its pivot, as shown at $b^5$ in Fig. 6, and extends forward past the pivot-pin a' to about the plane of the reel-post. It is then bent slightly upward and continued horizontally forward, and the connection between this arm and the arm $b^2$ is made adjustable by a series of perforations in the two arms and the strap, as shown in Fig. 6, so that the leverage and length of the connections may be changed as desired. The weight of the parts and the pivotal line on which the platform turns are so adjusted that the platform normally rests in the position shown in full lines in Fig. 3. When the platform is in this position, the stirrup-crank $a^4$ stands inclined forward, as shown in Fig. 6, and in order to hold the parts in this position, so as to support the gavel until the driver is ready to drop it, a spiral spring is coiled around the rock-shaft $a^2$ under the frame and reacts between the shaft and frame, so as to hold the platform and other parts in the position shown in Fig. 6. When the driver desires to dump the gavel, he pulls the stirrup toward him, thereby raising the arm $a^6$, pulling upward on the bar $b^4$, and tilting the rear end of the platform downward on the pivots a', the tension of the spring being regulated, so that only slight effort is required to do this, after which the platform returns automatically to receiving position. When the platform is tilted, the front end rises, as shown in dotted lines in Fig. 3, and the grain, which is thrown back by the reel while the gavel is being discharged, is held in an inclined position until the platform returns to receiving position, when it falls naturally upon it. The discharge of the gavel from the platform is assisted by the action of the stubble projecting up between the slats and engaging the heads of the grain. It is desirable, however, to be able to adjust the inclination of the platform and the height to which the front end is raised when in dumping position and at the same time maintaining the original inclination when in its normal or receiving position. This is the object of making the pivot-pins a' adjustable along the bars q and j, it being readily understood that the farther these pins are set toward the rear the greater the inclination of the slats will be and the higher the front edge when the platform is discharging the gavel. By this means the height to which the front edge may be raised and the inclination of the platform may be adjusted for varying heights and conditions of grain to effectually separate the grain cut during the dumping operation from the gavel already formed and deposit the latter on the ground.

The reel is provided with the usual means for adjusting its position, as shown in Fig. 2, and in order to prevent it from being set so low that its blades will strike the front edge of the platform when the latter goes up a stop is provided consisting of a rod $c^2$, which is connected at its lower end to a forward extension of the strap $b^4$. This rod passes loosely through a perforation in the reel-bracket $c^3$ and has a stop-pin or cotter $c^4$ secured about midway of its length. The front end of the strap $b^4$ moves up and down with the front edge of the platform, and as it does so the rod $c^2$ slides freely through the perforation in the bracket $c^3$, and the cotter $c^4$ is so positioned that it stops the upward movement of the rod before the edge of the platform rises high enough to be struck by the revolving blades of the reel. The connection of the rod $c^2$ with the arm $b^4$ is adjustable, and it is also desirable to make provision for setting the cotter higher or lower on the rod.

Having described my invention, what I claim, and desire to secure by Letters Patent, is—

1. The combination with the finger-bar of a mower, of a grain-receiving platform pivoted in rear of the finger-bar on pivots located about midway between its front and rear edges, and means for adjusting the pivotal point toward the front or rear.

2. The combination with the finger-bar of a mower, of rearwardly-projecting bars at the inner and outer ends of the finger-bar, and a grain-receiving platform pivoted to said bars about midway between its front and rear edges, the pivots being adjustable toward the front or rear.

3. The combination with the finger-bar and coupling-arm of a mower, of a supporting-wheel at the outer end of the finger-bar, a device for temporarily suspending the coupling-arm from the main frame at a point between the shoe and the end of the arm so as to hold the shoe elevated above the ground during the operation of the machine, and a grain-receiving platform in rear of the finger-bar hung on pivots located about midway between its front and rear edges, so that its front edge will rise to form a cut-off for the grain when its rear side is tilted downward to discharge.

4. The combination with the finger-bar and the inner and outer shoes of a mower, of the rearwardly-projecting bars $j$, $n$, secured to said inner and outer shoes, respectively, the grain-receiving platform hung on pivots $a'$, $a'$, located about midway between its front and rear edges, and the plate $g'$ attached to the bar $n$ and having the inwardly-projecting flange $x$.

5. The combination with the finger-bar of a mower, and a reel, of a grain-receiving platform pivoted in rear of the finger-bar, about midway between its front and rear edges, means for tilting the platform, means for adjusting the reel, and a stop-rod extending to and having a sliding connection with the reel, said rod being connected at its lower end to an arm which moves up and down with the front part of the platform.

6. The combination with the finger-bar of a mower, of a grain-receiving platform pivoted in the rear thereof on pivots located about midway between its front and rear edges, means for adjusting the pivotal points toward the front or rear, and means controlled by the driver for tilting the platform.

7. The combination with the finger-bar of a mower, of a reel, a grain-receiving platform pivoted in rear of the finger-bar about midway between its front and rear edges, means for adjusting the pivotal point toward the front or rear, and means under the control of the driver for tilting the platform and adjusting the reel.

In testimony whereof I affix my signature in presence of two witnesses

EDWARD A. JOHNSTON.

Witnesses:
 CHAS. H. CHAMBERS,
 F. H. GERE.